(12) United States Patent
von der Haar et al.

(10) Patent No.: US 10,173,487 B2
(45) Date of Patent: Jan. 8, 2019

(54) LINKAGE DEVICE FOR A MOTOR VEHICLE

(71) Applicant: ZF Friedrichshafen AG, Friedrichshafen (DE)

(72) Inventors: Lars von der Haar, Kettenkamp (DE); Heinfried Helms, Bad Essen (DE); Franz-Josef Marquardt, Georgsmarienhütte (DE); Jens Donzelmann, Badbergen (DE); Holger Rudolph, Bad Essen (DE); Andreas Rosengarten, Bad Iburg (DE)

(73) Assignee: ZF FRIEDRICHSHAFEN AG, Fridrichshafen (DE)

( * ) Notice: Subject to any disclaimer, the term of this patent is extended or adjusted under 35 U.S.C. 154(b) by 369 days.

(21) Appl. No.: 14/652,827

(22) PCT Filed: Nov. 18, 2013

(86) PCT No.: PCT/EP2013/074003
§ 371 (c)(1),
(2) Date: Jun. 17, 2015

(87) PCT Pub. No.: WO2014/095188
PCT Pub. Date: Jun. 26, 2014

(65) Prior Publication Data
US 2015/0328946 A1 Nov. 19, 2015

(30) Foreign Application Priority Data

Dec. 18, 2012 (DE) .................. 10 2012 223 609

(51) Int. Cl.
*B60G 7/00* (2006.01)
*F16C 11/06* (2006.01)

(52) U.S. Cl.
CPC .............. *B60G 7/005* (2013.01); *F16C 11/06* (2013.01); *F16C 11/0609* (2013.01); *F16C 11/0642* (2013.01); *Y10T 403/32196* (2015.01)

(58) Field of Classification Search
CPC ... F16C 11/06; F16C 11/0609; F16C 11/0642; B60G 7/005; B60G 2204/416;
(Continued)

(56) References Cited

U.S. PATENT DOCUMENTS

| 938,219 | A | * | 10/1909 | Crumb | ................ B60N 2/3011 |
| | | | | | 108/1 |
| 2,126,389 | A | * | 8/1938 | Hufferd | ............... F16C 11/0604 |
| | | | | | 403/123 |

(Continued)

FOREIGN PATENT DOCUMENTS

| DE | 1 085 775 | 7/1960 |
| DE | 2 150 354 | 4/1972 |

(Continued)

OTHER PUBLICATIONS

Japanese Office Action issued in corresponding Japanese Patent Application No. 2015-546917 dated Jun. 28, 2017.

(Continued)

*Primary Examiner* — Michael P Ferguson
(74) *Attorney, Agent, or Firm* — Davis & Bujold PLLC; Michael J. Bujold (57) ABSTRACT

A joint device (6) including an axially extending pivot pin (8) and a housing (11) that surrounds the pivot pin radially, wholly or partially, such that the pivot pin (8) and the housing (11) can move relative to one another at least by pivoting. A separate retaining element (12; 13), for the housing (11), is associated with the joint device (6). The joint device is designed in such manner that the retaining (Continued)

element (11) starts from an area (14) of the housing (11) and engages in a substantially axial channel (15) of the pin (8).

11 Claims, 6 Drawing Sheets

(58) Field of Classification Search
CPC ..... Y10T 403/32565; Y10T 403/32573; Y10T 403/32639; Y10T 403/32681; Y10T 403/32704
See application file for complete search history.

(56) References Cited

U.S. PATENT DOCUMENTS

| | | | | |
|---|---|---|---|---|
| 2,211,817 | A | * | 8/1940 | Hufferd ............... F16C 11/0661 403/124 |
| 2,676,045 | A | * | 4/1954 | Moskovitz ............. F16C 11/06 403/125 |
| 2,707,645 | A | * | 5/1955 | Moskovitz .......... F16C 11/0661 403/124 |
| 2,885,248 | A | * | 5/1959 | White ................ F16C 11/0604 264/242 |
| 3,731,957 | A | | 5/1973 | Uchida |
| 4,986,688 | A | * | 1/1991 | Tuan ................... F16C 11/0661 403/127 |
| 7,114,688 | B2 | | 10/2006 | Rudolf |
| 7,413,201 | B2 | * | 8/2008 | Freytag .................... B60G 3/24 280/93.512 |
| 7,708,488 | B2 | | 5/2010 | Kunze et al. |
| 8,038,162 | B2 | | 10/2011 | Knopp et al. |
| 2009/0154988 | A1 | | 6/2009 | Kunze et al. |

FOREIGN PATENT DOCUMENTS

| | | | |
|---|---|---|---|
| DE | 73 36 029 U1 | 8/1978 | |
| DE | 81 37 469 U1 | 4/1982 | |
| DE | 199 23 320 A1 | 12/1999 | |
| DE | 10 2004 055 961 A1 | 5/2006 | |
| DE | 602 16 733 T2 | 11/2007 | |
| DE | 10 2006 039 863 A1 | 3/2008 | |
| DE | 11 2006 000 910 T5 | 7/2008 | |
| FR | 2 315 034 A1 | 1/1977 | |
| GB | 1 476 524 | 6/1977 | |
| JP | S49010780 B1 | 3/1974 | |
| JP | H0280042 U | 6/1990 | |
| JP | 3-176214 * | 7/1991 | ............. F16C 11/06 |
| JP | H1119914 A | 1/1999 | |
| JP | 2008537713 A | 9/2008 | |
| JP | 2010-276101 A | 12/2010 | |
| WO | 2006110049 A2 | 10/2006 | |

OTHER PUBLICATIONS

German Search Report Corresponding to 10 2012 223 609.0 dated Dec. 4, 2013.
International Search Report Corresponding to PCT/EP2013/074003 dated Feb. 3, 2014.
Written Opinion Corresponding to PCT/EP2013/074003 dated Feb. 3, 2014.
International Preliminary Report on Patentability Corresponding to PCT/EP2013/074003 dated Jan. 22, 2015.

* cited by examiner

LINKAGE DEVICE FOR A MOTOR VEHICLE

This application is a National Stage completion of PCT/EP2013/074003 filed Nov. 18, 2013, which claims priority from German patent application serial no. 10 2012 223 609.0 filed Dec. 18, 2012.

FIELD OF THE INVENTION

The invention concerns a linkage device, comprising at least one pivot pin and at least one housing that surrounds this fully or partially, wherein the pivot pin and the housing can move at least by pivoting relative to one another and a separate retaining means for the housing is associated with the linkage device.

BACKGROUND OF THE INVENTION

In joint devices of this type, for example designed as ball joints, it is often necessary to provide a seal against dirt and water in order to prevent compromising the mobility of the components relative to one another, for example due to wear or flushing out of a lubricant. However, if such a seal is damaged moisture can make its way into the joint, so that a ball socket arranged on the pin and/or an outer ball shell that holds this movably becomes damaged. The joint then becomes loose and in the course of time the ball socket can work its way through the ball shell and the housing, creating a risk that the housing may lift clear of the joint pin so that the guiding and holding function of the joint device is lost. This amounts to a serious safety risk.

To provide a remedy for this it is known to fix a T-shaped armature in the pivot pin, which projects upward out of the pin with a crosspiece and engages above it in a counter-component of a housing. However, as viewed axially such an armature is asymmetrical so that on the one hand the pivoting of the housing relative to the pin is substantially impeded in some directions and on the other hand assembly is made more difficult. In addition counter-surfaces have to be provided in the cover or housing, which engage behind the projecting crosspiece. The formation of such surfaces is an elaborate structural process and demands undercuts or the use of additional components.

SUMMARY OF THE INVENTION

The purpose of the present invention is to achieve an improvement in this respect.

The invention solves that problem with a motor vehicle having the characteristics specified below. Advantageous design features and further developments of the invention are also discussed below.

With the invention according to the description, since the retaining means start from a part of the housing and engage in an at least substantially axial channel of the pin, it is no longer necessary for the retaining means to deviate from rotational symmetry about the axial direction. This facilitates assembly and, very advantageously, the ability of the joint to pivot in any direction is fully preserved.

If the retaining means start from an area of the housing located, at least in a pivot position of the joint, in an axial extension of the pin, the retaining means can for example start from a cover associated with the housing which surrounds the pin centrally. Depending on the design, the retaining means can be made integrally with the cover or other part of the housing, or can be attached thereto. In particular, in the pivot position concerned the arrangement of the retaining means is rotationally symmetrical, which makes it possible, starting from that pivot position, for the joint device to be tilted to any side at an equal angle.

When the area of the housing from which the retaining means start is a cover component fixed in a rigid part of the housing, assembly can be very simple. For example, during assembly the retaining means can be brought into engagement with the pin at the same time as the cover component is being fitted.

In one version of the invention, the retaining means comprise an elastically deformable shaft section. In this way, for example during the fitting of the cover, the shaft section can extend through an engagement channel left free in the pin and be secured therein or on the side axially opposite the cover component. In this case it is helpful for the channel to be sufficiently oversized relative to the diameter or transverse extension of the shaft section so that even when the joint is angled the shaft section does not contact the flange. This prevents any mechanical damage of the pin or the retaining means.

In a very inexpensive and simply designed manner, the elastically deformable shaft section can be formed by a wire cable. A pliable plastic rod or cable can also be used.

If the retaining means pass axially completely through the pin, then they can be secured at the axially far end of the pin itself or even on a flange plate that holds the pin onto a component such as a differential housing. In the figures it can be seen that the pin, together with the flange plate, can be made integrally.

In another version of the invention, from the housing area on which it is held the retaining means have a solid shaft section and are supported within the axial extension of the pin. In this case, for example, the rigid neck area can merge into a widened head portion located in the axial channel of the pin with its center at the pivot point of the joint. Here too the swiveling of the joint is unrestricted. In the event of damage to the joint such that the retaining means would remain effective, the head portion would then encounter for example shoulders inside the pin and could actuate a sensor positioned there, which emits a signal indicating that the joint has been damaged.

A motor vehicle with at least one joint device according to invention is also described below.

In particular, such a motor vehicle can be a commercial vehicle (CV) and such a joint device can serve, inter aria, to guide an axle of the vehicle by means of one or more control arm(s) leading directly or indirectly from one or more chassis components to the joint device. Typically, a wishbone arrangement for supporting a rear axle can be made according to the invention.

BRIEF DESCRIPTION OF THE DRAWINGS

Advantages and features of the invention emerge from the example embodiments of the object of the invention illustrated in the drawing and described below.

The drawings show.

DETAILED DESCRIPTION OF THE PREFERRED EMBODIMENTS

Figure 1:
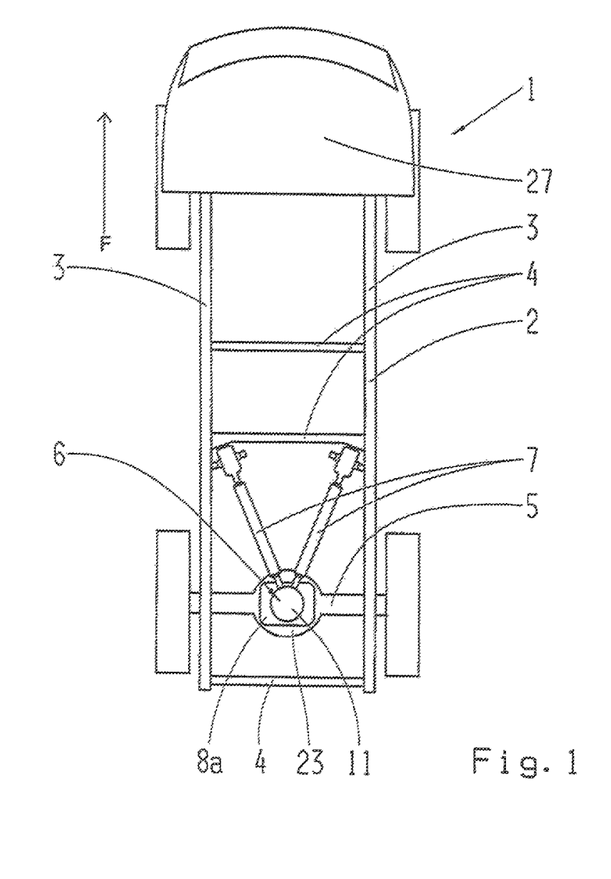
FIG. 1: A schematic plan view of a commercial vehicle, shown as an example, with a joint device engaged with a rear axle differential by way of two wishbones.

The motor vehicle 1 shown only schematically in FIG. 1 is in this case a commercial vehicle (CV) and comprises a vehicle chassis 2. Such a chassis 2 can typically comprise two lateral longitudinal members 3 and several transverse members 4, and can as a whole be designed in various ways. In this case, for example, at least one axle 5, here for example a rear axle, is supported on the chassis 2.

For example a building-site vehicle or an off-road vehicle can also be made according to the invention.

The motor vehicle 1 shown is provided with at least one joint device 6; it can also have several joint devices of the type described in more detail below. The joint device 6 shown here serves for guiding an axle 5 of the motor vehicle 1. For this, one or more (in this case two) control arms 7 in a triangular arrangement lead directly or indirectly from one or more chassis components 3, 4 to the joint device 6. An X-shaped control arm arrangement with four-point connection is also often used here. Further components connected to the chassis can also be so connected by way of joint devices 6 according to the invention.

The joint device 6 itself in this case comprises an axially extending pivot pin 8 with a substantially ball-shaped wider portion 9. This can be formed integrally on the pivot pin 8 or it can be a separate component, and can pivot and tilt relative to a joint shell 10 that holds it in the manner of a ball joint. The joint shell 10 is surrounded firmly by an outer housing 11 of the joint device 6, so that the mobility of the joint shell 10 relative to the ball-shaped wider portion 9 at the same time allows a relative mobility—here in a pivoting direction orientated laterally to the travel direction F and a tilt direction in the travel direction F—between the housing 11 and the pivot pin 8. Rotation about the axis 12 between the housing 11 and the pivot pin 8 can also be possible. Such joint devices 6 can also, for example, be provided in wheel joints or for front axle guides.

In this case, for example the pivot pin 8 widens out downward to form a ball-shaped flange 8a, which for example is attached to a differential housing of a rear axle 5. The flange 8a can also be a component separate from the pin 8, or the pin 8 can also be connected quite differently to other components and can also be fitted in a different position.

The housing 11 in this case surrounds the pivot pin 8 radially completely; alternatively, it may also surround the pin only partially. A seal between the housing 11 and the pivot pin 8 or the flange 8a is additionally provided, although this is not shown here.

Furthermore, the joint device 6 comprises separate retaining means 12, 13, for the housing 11, such that the retaining means start from an area 14 of the housing 11 outside the pin 8—here, above it and from there engage in an at least substantially axial channel 15 of the pin 8. The area 14 can be an integral part of the rigid housing component 11a or a separate cover component 11b connected thereto. This cover component 11b can for example be axially outside the pin 8 and when the joint device 6 is not in a deflected position, it can pass through the joint axis 16 centrally.

In a pivot position, to be precise a so-termed zero position in which the joint is not pivoted, the area 14 from which the retaining means 12, 13 start is in the axial extension of the pin 8. The retaining means 12, 13 can then extend in a straight line and axially centrally in the engagement channel 15. In this pivot position the arrangement of the retaining means 12, 13 as viewed axially from above is completely rotation-symmetrical, so that from that pivot position the joint device can pivot to any side at an equal angle without any deviation from isotropy. The mobility of the joint device 6 is therefore not restricted in any way by the retaining means 12, 13.

Figure 2:
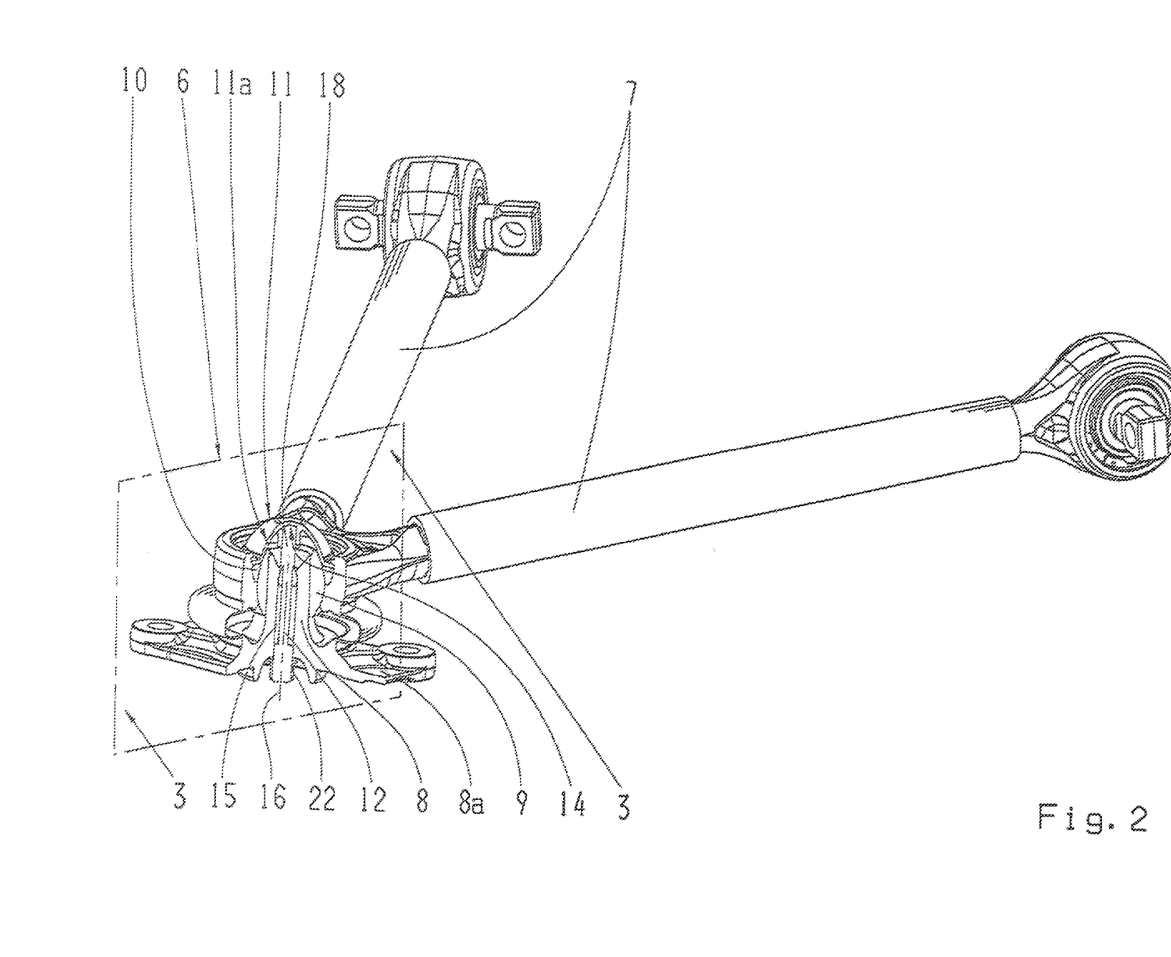
FIG. 2: A detailed perspective view, seen obliquely from above, of a joint device with two wishbones and a central housing which surrounds a pin projecting from a flange plate, in a schematically represented first embodiment of the invention.
Figure 3:
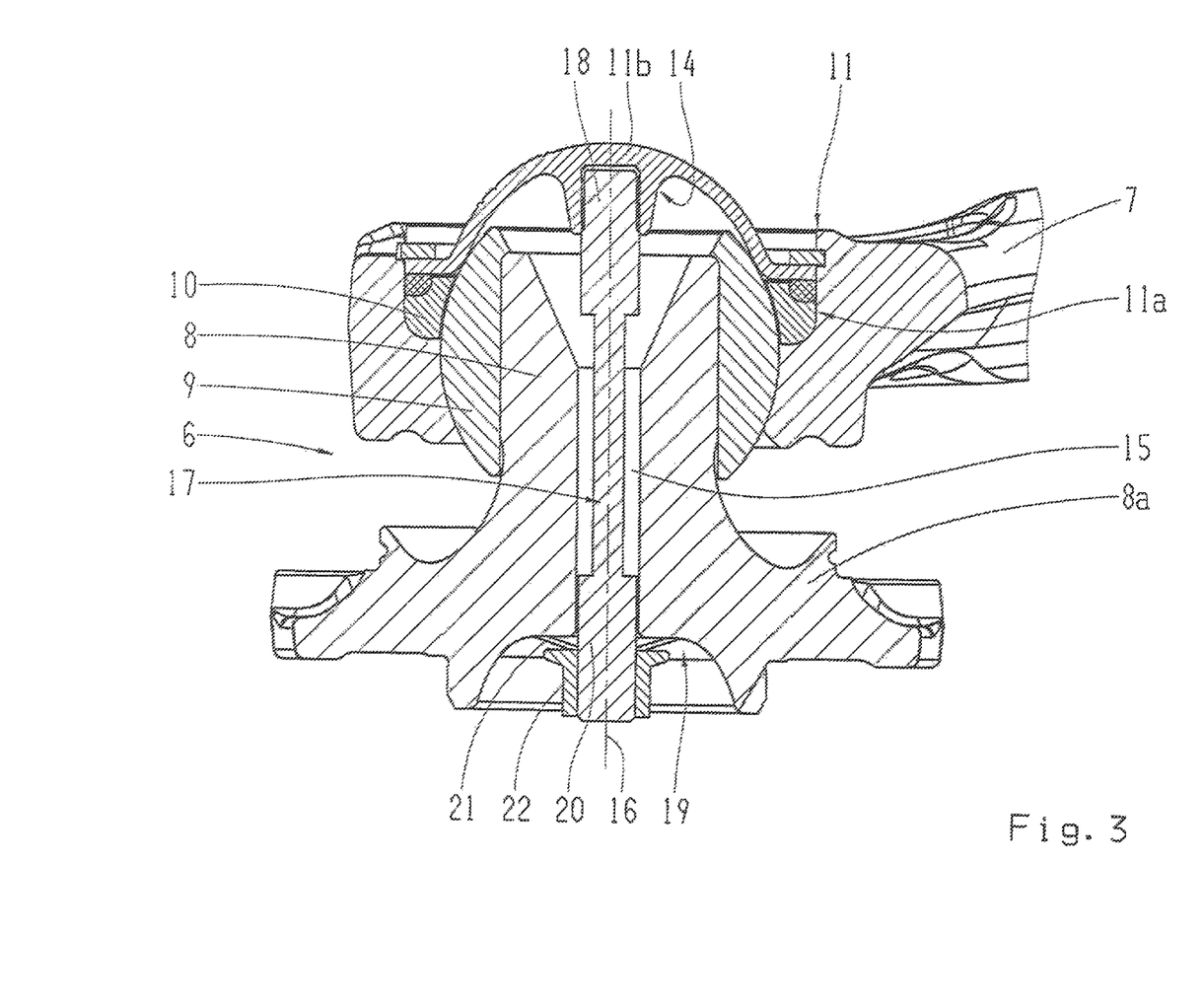
FIG. 3: A cross-section representation of the joint device, corresponding approximately to the section line 3-3 in FIG. 2, FIG. 4: A detailed view of an example of a retaining means made with a wire cable.
Figure 4:
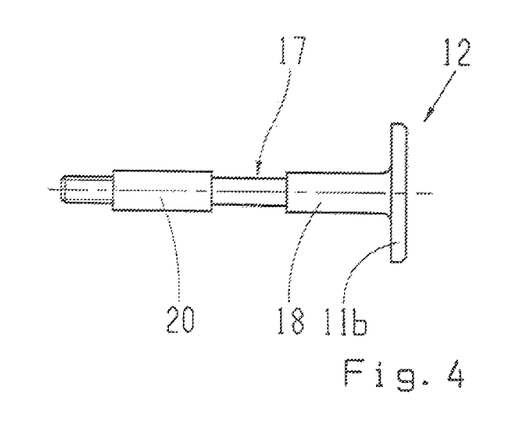
Figure 5:
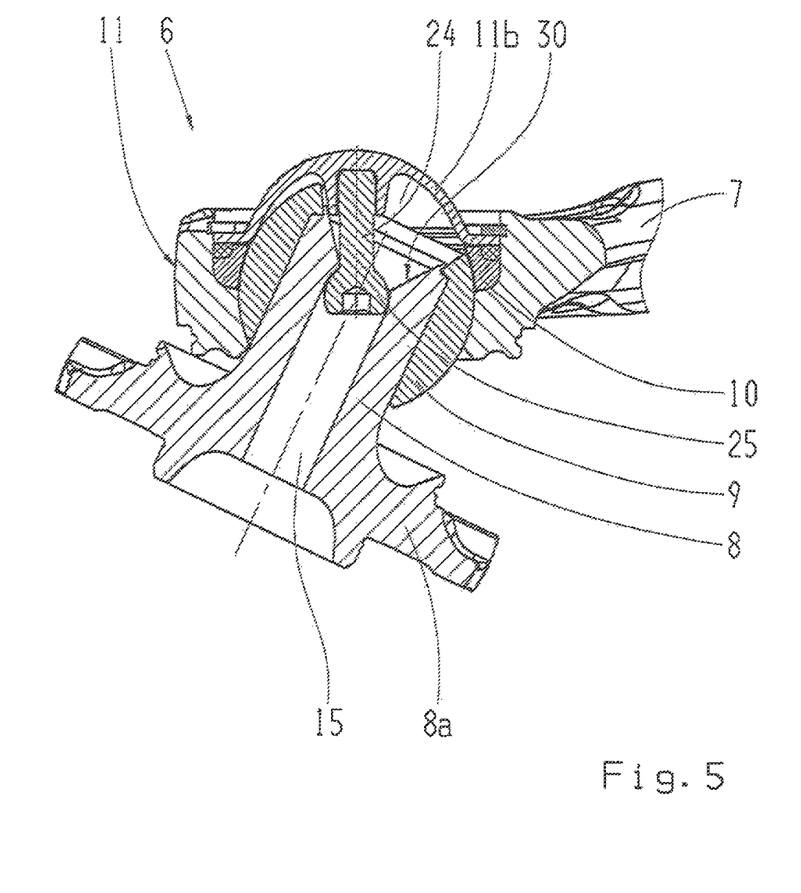
FIG. 5: A representation similar to FIG. 4, but showing a further embodiment of the invention having a ball head anchored at the pivoting point of the pin, shown here at the maximum deflection of the joint device.

In a first example embodiment according to FIGS. 2 to 4 the retaining means 12 comprise an elastically deformable shaft section 17. In this case the elastically deformable shaft section 17 is in the form of a wire cable. Alternatively, for example, an elastically deformable plastic rod, a metallic sheet strip, a chain or a fiber material could be considered.

The steel cable shown in this case is for example pressed into a cover terminal 18 that can perhaps be in the form of a sleeve-shaped body formed integrally with a cover component 11b as in FIG. 3. Alternatively, the cover terminal 18 can also for example have an outer thread and be screwed into a threaded sleeve of the cover component 11b, or it can pass through the latter and be secured on the outside of the cover component 11b.

At the axially opposite end of the retaining means 12 too, several versions are possible. Here, the retaining means 12 pass axially completely through the pin 8. In that case the retaining means are supported at an end 19 of the pin 8 opposite the part fixed to the housing 11, As shown in FIG. 3 there is there a threaded terminal 20 that clamps the cable, on which for example a nut 22 pre-stressed by a spring washer 21 is fitted. The length of the cable 17 pressed into the threaded terminal 20 amounts, for example, to a little more than twenty millimeters, and the cable diameter, for example, is six to eight millimeters. The spring washer 21 holds the cable or similar 17 under tension, but allows sufficient movement. If now the ball sleeve 9 works through the housing 11, the housing is still held by the retaining means 12 onto the flange 8a.

For this, the spring washer 21 is supported at the axial end of the pin 8. Here the pin 8 widens out integrally into a plate-like flange 8a which connects the pin 8 to another vehicle component, for example a differential housing 23 of an axle, so that the retaining means 12 are secured to the flange 8a. This can also be formed separately from the pin 8. Alternatively, it would also be possible to secure the retaining means 12 to the pin 8 itself.

In addition it can be possible to provide a wear indication which, for example, indicates a deformation of the cover component 11b, or an element can be arranged in the cover component 11b which is destroyed when the cable of the retaining means 12 is under tension and which then distributes a dye on the outside over the joint device 6. Likewise, there can be a sensor in the cable 17 which, under tensile loading above a certain limit, emits a signal to the driver's cabin 27.

Figure 6:
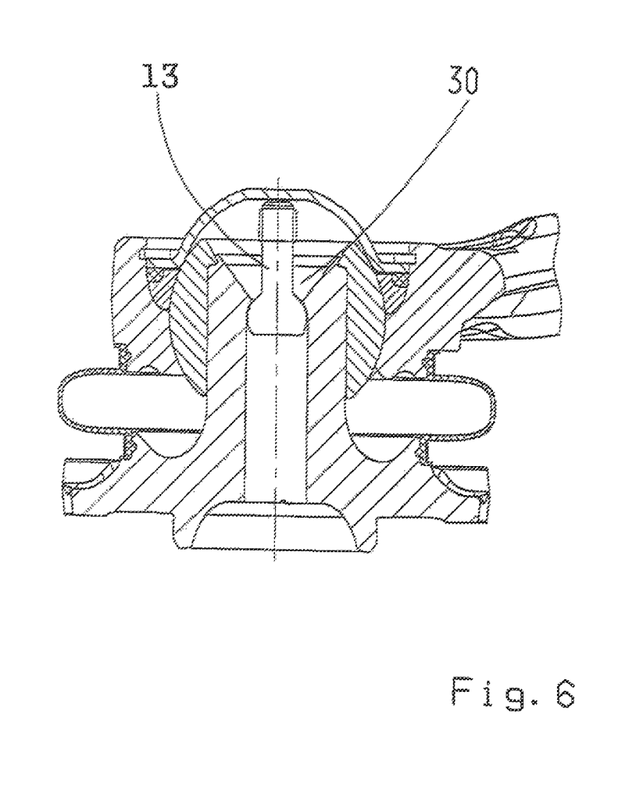
FIG. 6: A view similar to FIG. 5, but at the zero setting of the joint device so that in this case, only as an example, the ball head is flattened at the bottom.
Figure 7:
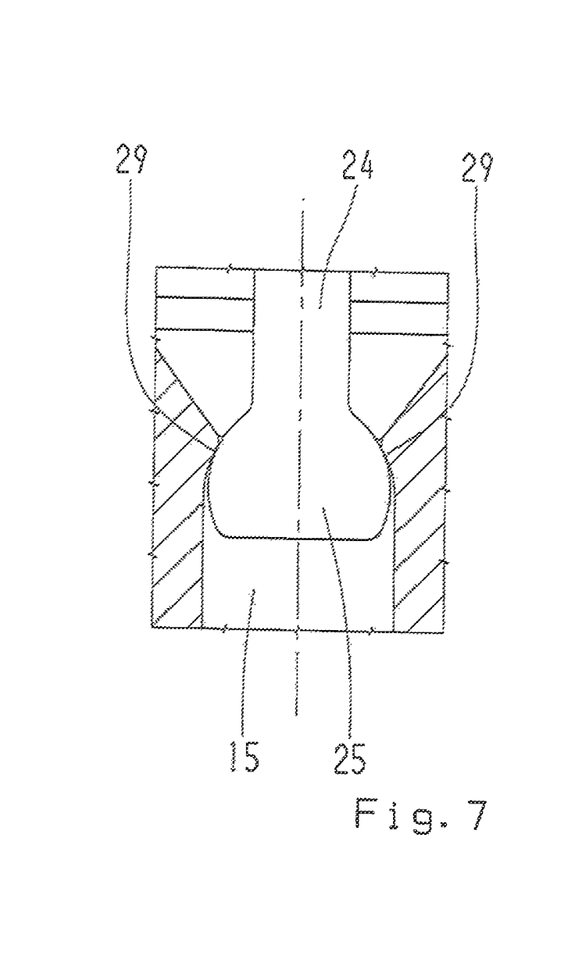
FIGS. 7 and 7a: A detailed view of the embodiment according to FIG. 6, with the retaining means in the normal position (left) and with the retaining means under tension (right).
Figure 7A:
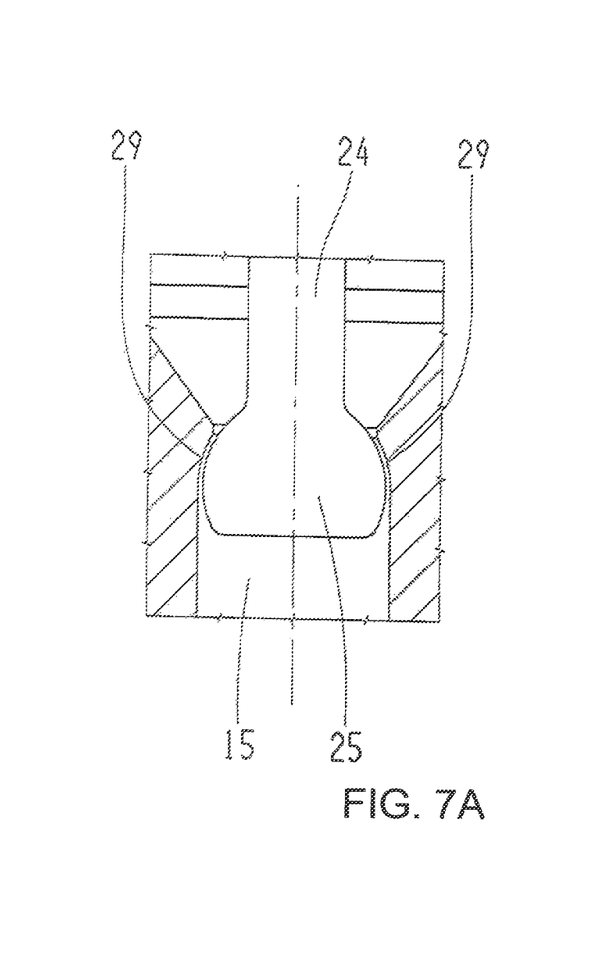

In another embodiment of the invention illustrated in FIGS. 5 to 7A, the retaining means 13 comprise a rigid shaft section 24 and are supported within the axial extension of the pin 8. For this the rigid neck section, made of, for example, steel or plastic, merges into a widened head area 25 which is inside the axial channel 15 of the pin 8. Then, in the ordinary position of the joint device 6 its center coincides with the pivot point of the joint 6. In this case the head area 25 can be ball-shaped as a whole—or, as shown in FIGS. 6 and 7, only on its side facing toward the shaft section 24. In the unworn, ordinary condition of the joint device 6, in which the retaining means are not stressed, the head area 25 is an axial distance 28 away from a tapering bottleneck section 29 of the engagement channel 15 (FIG. 7A), whereas in contrast, when there is play in the joint 6 the retaining means 13 can be pulled up far enough to come in contact with the bottleneck 29 (FIG. 7), This contact can even be used for the detection of wear, possibly by way of pressure sensors or the closing of an electric circuit.

Figure 6A:
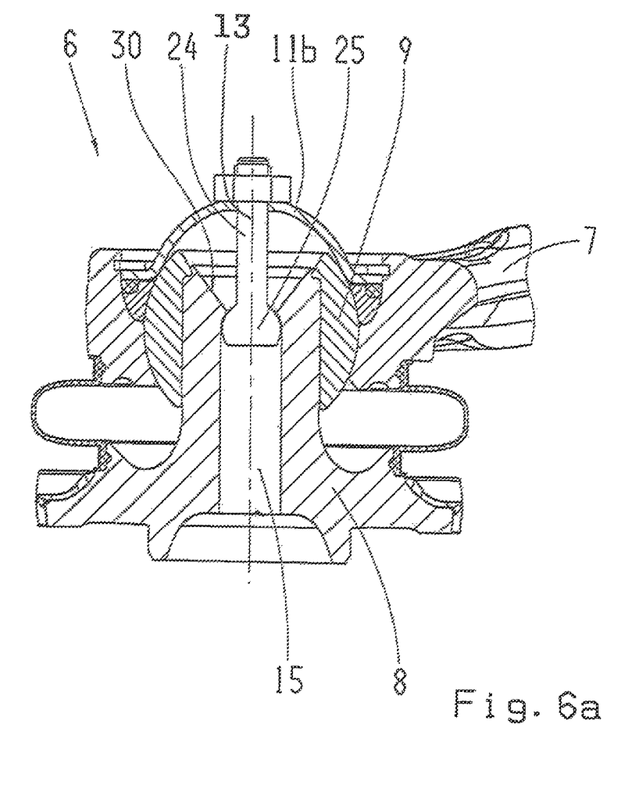
FIG. 6a: A view similar to that of FIG. 6, but with retaining means that pass through the cover component and are secured on the outside.

As can be seen in FIG. 6a, here the retaining means 13 can also be secured from the outside on the cover component 11b or, as in FIG. 6, they can be screwed from the inside in the cover component 11b or secured thereto in some other way.

In this version too the ability of the joint device 6 to pivot in any direction is fully preserved. For this, an all-round conical free cut-out 30 is provided, which also allows a large deflection of the joint 6 by leaving a free space for the shaft section 24 of the retaining means 13.

In both versions, therefore, a pivoting angle of more than 50° is maintained.

It is understood that such a joint device 6 can be used at various points in the vehicle 1, in particular also within links and chassis joints such as axial joints.

| | Indexes |
|---|---|
| 1 | Motor vehicle |
| 2 | Vehicle chassis |
| 3 | Longitudinal member |
| 4 | Transverse member |
| 5 | Vehicle axle |
| 6 | Joint device |
| 7 | Control arm |
| 8 | Pivot pin |
| 8a | Flange |
| 9 | Ball-shaped wider portion |
| 10 | Joint shell |
| 11 | Housing |
| 11a | Rigid housing portion |
| 11b | Cover component |
| 12 | Retaining means |
| 13 | Retaining means |
| 14 | Starting point of the retaining means |
| 15 | Engagement channel |
| 16 | Joint axis |
| 17 | Elastic shaft section |
| 18 | Cover terminal |
| 19 | Pin end |
| 20 | Threaded terminal |
| 21 | Spring washer |
| 22 | Nut |
| 23 | Differential housing |
| 24 | Rigid shaft section |
| 25 | Head area |
| 26 | Center of the joint |

-continued

| | Indexes |
|---|---|
| 27 | Driver's cabin |
| 28 | Axial distance |
| 29 | Bottleneck section |
| 30 | Free cut-out |

The invention claimed is:

1. A joint device comprising:
an axially extending pivot pin defining an axis, the pivot pin having a spherical portion located at a first end thereof, and an at least substantially axial channel that extends through the pivot pin along the axis between the first end and an opposite second end of the pivot pin and through the spherical portion of the pivot pin,
a housing having first and second opposite surfaces and an axial passage extending between the first and the second surfaces and having a spherical bearing surface adjacent the first surface of the housing, and the spherical portion of the pivot pin extending into the axial passage of the housing and being pivotally received by the bearing surface such that the housing radially surrounds the pivot pin,
a cover component being fixed to the second surface of the housing and extending outwardly away from the passage, and the cover component comprising a spherical cavity for receiving the spherical portion of the pivot pin when the pivot pin is pivoted to a tilted position relative to the axial passage, and
a separate retaining means having an end fixed to a central portion of the cover component within the spherical cavity and outside the axial passage of the housing beyond the second surface of the housing and an opposing end extending within and being pivotally received by a portion of the axial channel, and
wherein, when the axis of the pivot pin is aligned with the axial passage of the housing in an untilted position, the spherical portion of the pivot pin extends beyond the first surface of the housing and is at least substantially level with the second surface of the housing.

2. The joint device according to claim 1, wherein the retaining means, when in the untilted position as viewed axially from above, is rotationally symmetrical.

3. The joint device according claim 1, wherein the joint device is pivotable, from the untilted position, to all sides with the same angle.

4. The joint device according to claim 1, wherein the cover component is held in a rigid part at the second surface of the housing.

5. The joint device according to claim 1, wherein the retaining means has a rigid shaft section and is supported within the axial channel of the pivot pin.

6. The joint device according to claim 5, wherein the rigid shaft section merges into a widened head that is located in the axial channel of the pivot pin, and a center of the head is at a pivot point of the joint device which is boated in the axial passage of the housing between the first and the second surfaces of the housing.

7. The joint device according to claim 6, wherein the axial channel has a tapering bottleneck section that is located between the head of the retaining means and the end of the retaining means which is attached to the cover component.

8. The joint device according to claim 6, wherein an end of the axial channel tapers radially inward forming a bottleneck section of the axial channel, and the pivot pin is received within the axial channel such that the widened head of the pivot pin is axially spaced away from the bottleneck section by a gap.

9. A motor vehicle in combination with at least one joint device, the at least one joint device comprising:
- an axially extending pivot pin comprising a shaft defining an axis, a spherical portion located on the shaft at a first end thereof, an at least substantially axial channel that extends through the shaft along the axis between the first end and a second end of the pivot pin and through the spherical portion of the pivot pin, and an end of the axial channel tapers radially inward forming a radially narrow end of the channel;
- a housing having first and second opposite surfaces and an axial passage extending through the housing between the first surface and the second surface and having a spherical bearing surface adjacent the first surface, the spherical portion of the pivot pin extending into the axial passage of the housing and being pivotally received by the bearing surface such that the housing radially surrounds the pivot pin, and, when the axis of the pivot pin is aligned with the axial passage of the housing in an untilted position, the spherical portion of the pivot pin extends beyond the first surface of the housing and is at least substantially level with the second surface of the housing;
- a cover component connected to the second surface of the housing and which extends outwardly away from the passage, and the cover component comprising a spherical cavity for receiving the spherical portion of the pivot pin when the pivot pin is pivoted; and
- a retaining means attached to a central portion of the cover component which is located outside the axial passage beyond the second surface of the housing, the retaining means being engagable centrally with the pivot pin and either being made integrally with or attached to the cover component, and the retaining means comprising a shaft having an axial end affixed to the cover component and an opposing axial end with a widened head extending within the axial channel and pivotally received by the radially narrow end such that the axial channel facilitates axial movement of the retaining means in the channel with respect to the pivot pin.

10. The motor vehicle according to claim 9, wherein the motor vehicle is a commercial vehicle having a chassis comprising longitudinal and transverse members and an axle being supported on the chassis, the pivot pin having a flange that is connected to the axle of the motor vehicle to secure the joint device to the axle, the housing being formed by an end of at least one control arm, and the at least one control arm leading from the joint device to at least one of the longitudinal and the transverse members of the chassis.

11. A joint device comprising:
- a pivot pin comprising a shaft defining an axis and having a first axial end with a ball shaped head, a passage that extends through the pivot pin along the axis between the first and a second axial end of the pivot pin and through the ball shaped head, and an end of the passage tapers radially inward forming a radially narrow end of the passage;
- a housing having first and second opposite surfaces and an opening extending axially through the housing between the first and the second surfaces and having a spherical bearing surface adjacent the first surface, and the opening and the bearing surface of the housing pivotally receives the ball shaped head of the pivot pin such that the pivot pin and the housing are pivotally movable relative to one another, and wherein, when the axis of the pivot pin is aligned with the opening of the housing in an untilted position, the ball shaped head of the pivot pin extends beyond the first surface of the housing and is at least substantially level with the second surface of the housing;
- a cover component being fixed to the housing at the second surface thereof to enclose the ball shaped head within the opening of the housing and which extends outwardly away from the opening, the cover component comprising a spherical cavity for receiving the ball shaped head of the pivot pin when the pivot pin is pivoted, and having a receiving area attached to a central portion of the cover component which is located outside the opening beyond the second surface of the housing, and is coaxially aligned with the axis of the pivot pin when the pivot pin is in the untilted position; and
- a retaining means for the housing being received within the passage of the pivot pin, the retaining means comprising a shaft having one axial end being integrally connected, via the receiving area, to the cover component, and an opposing axial end with a widened head extending within the passage and pivotally received by the radially narrow end such that the retaining means is axially movable within the pivot pin.

* * * * *